US011272054B1

United States Patent
Gerrard et al.

(10) Patent No.: US 11,272,054 B1
(45) Date of Patent: Mar. 8, 2022

(54) AIDED CALL TRANSFER SYSTEM

(71) Applicant: United Services Automobile Association (USAA), San Antonio, TX (US)

(72) Inventors: Trent Wade Gerrard, Schertz, TX (US); Jesus Montoya, San Antonio, TX (US); Aaron Michael Gonzales, San Antonio, TX (US); Randy Smith, Cottonwood Shores, TX (US); Jeffrey Cory Perry, San Antonio, TX (US); Daniel Lee Navarro, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/270,405

(22) Filed: Feb. 7, 2019

Related U.S. Application Data

(60) Provisional application No. 62/627,573, filed on Feb. 7, 2018.

(51) Int. Cl.
| | |
|---|---|
| *H04M 3/42* | (2006.01) |
| *H04M 3/493* | (2006.01) |
| *G10L 15/08* | (2006.01) |
| *G10L 15/04* | (2013.01) |
| *G10L 15/02* | (2006.01) |
| *H04L 67/306* | (2022.01) |

(52) U.S. Cl.
CPC .......... *H04M 3/4936* (2013.01); *G10L 15/02* (2013.01); *G10L 15/04* (2013.01); *G10L 15/08* (2013.01); *H04L 67/306* (2013.01); *G10L 2015/088* (2013.01); *H04M 2201/40* (2013.01)

(58) Field of Classification Search
CPC ........ H04M 3/58; H04M 3/54; H04M 3/5175; H04M 3/523; H04M 3/5235; H04M 3/5183; H04M 3/5233; H04M 3/5166; H04M 3/5232; H04M 3/4936
USPC ............ 379/212.01, 265.01–265.02, 265.13
See application file for complete search history.

(56) References Cited

U.S. PATENT DOCUMENTS

| | | | | |
|---|---|---|---|---|
| 5,991,391 | A * | 11/1999 | Miloslavsky | H04L 67/306 379/220.01 |
| 9,955,021 | B1* | 4/2018 | Liu | H04M 3/2218 |
| 10,171,671 | B1* | 1/2019 | Prasad | H04M 3/5235 |
| 2017/0003856 | A1* | 1/2017 | Mande | G06Q 30/01 |
| 2019/0158671 | A1* | 5/2019 | Feast | G06Q 10/063 |
| 2019/0273821 | A1* | 9/2019 | Carty | H04M 3/5133 |

* cited by examiner

*Primary Examiner* — Rasha S Al Aubaidi
(74) *Attorney, Agent, or Firm* — Fish & Richardson P.C.

(57) ABSTRACT

Methods, systems, and apparatus, including computer programs encoded on computer storage media, for determining a transfer option for transferring a call. One of the methods includes: dynamically capturing, by the at least one processor, during a call between a first individual and a second individual, one or more keywords from a verbal conversation between the first individual and the second individual during the call; automatically determining, by the at least one processor, a transfer option for transferring the call based on the captured one or more keywords; and transferring, by the at least one processor, the call to a transfer unit specified by the determined transfer option.

18 Claims, 6 Drawing Sheets

| Aided Call Transfer 200 | | | Manual Transfer ▽ |
|---|---|---|---|
| BANK | P&C INSURANCE | INVESTMENT | INSURANCE |
| CHECKING | AUTO | MAS | LIFE |
| SAVINGS | | | |

☐ New Offer
■ Recent Interest
☐ Relationship Zone

Life Event: Marriage 202

---

Add a Life Event 204

Life Event: [ Marriage ▽ ]

Estimated Date: [_____] MM/DD/YYYY

Event Affects: ☑ Mr. John Smith (MEMBER)
☐ Ms. Mary Smith (Spouse)

Add Notes: [_____]

✓ OK    ✗ Cancel

FIG. 2B

Aided Call Transfer 200     ▭ Manual Transfer ▽

| BANK | P&C INSURANCE | INVESTMENT | INSURANCE |
|---|---|---|---|
| CHECKING | AUTO | MAS | LIFE |
| SAVINGS | | | |

☐ New Offer
■ Recent Interest

Life Event: Marriage ▽

---

Transfering to: New Member Solutions   206    ✕

Check box to Warm Transfer ☐ ← 208

Notes:    ← 210

> Customer just got married and is looking to open up a joint checking account with his wife Hours of Operation ← 212
Mon-Fri (6:30 a.m. – 9 p.m.) Sat (8 a.m. – 4p.m.)

TRANSFER ← 214

AIDED CALL TRANSFER SYSTEM

CROSS-REFERENCE TO RELATED APPLICATION

This application claims priority under 35 U.S.C. § 119 to U.S. Application Ser. No. 62/627,573, filed on Feb. 7, 2018, and entitled "Aided Call Transfer System," the entire contents of which is incorporated by reference herein.

BACKGROUND

Call centers are widely deployed by companies, government agencies, and other organizations to handle incoming telephone calls from customers or users who want to ask questions and/or to request assistance. To handle such inquiries and requests, call centers are staffed with technical support personnel, customer service personnel, or sales support personnel (hereinafter collectively referred to as agents). Depending on the nature of an inquiry or a request for assistance, an agent may handle the inquiry or request, or may forward the inquiry or request to another agent by transferring the call.

SUMMARY

In general, one innovative aspect of the subject matter described in this specification can be embodied in methods that include determining, by a speech recognition engine, a plurality of keywords from information provided by a user to an agent during a call; automatically identifying a transfer option for transferring the call based on the plurality of keywords; and providing, on a user device of the agent, the identified transfer option for transferring the call.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Automatically identifying a transfer option may include automatically identifying, based on a first keyword, a plurality of potential transfer options for transferring the call, wherein the first keyword is determined, by the speech recognition engine, from a first part of the conversation between the user and the agent; and automatically identifying, among the plurality of potential transfer options, the transfer option based on a second keyword, wherein the second keyword is determined, by the speech recognition engine, from a second part of the conversation between the user and the agent. The first keyword may indicate a life event of the user. The method may include automatically updating a user profile of the user with the life event. The agent may be employed by an organization and the transfer option identifies a unit at the organization where the call should be transferred. The method may include receiving, from the user device, a selection of the identified transfer option; and automatically transferring the call to the identified unit at the organization. The method may include displaying, on the user device, an option for transferring the call to the identified unit using warm transfer. The method may include automatically pre-filling a note to a receiving agent at the identified unit based on the information provided by the user to the agent during the call.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2C illustrate simplified example graphical user interface (GUI) of an aided call transfer system for an agent to transfer a call.

Like reference numbers and designations in the various drawings indicate like elements.

DETAILED DESCRIPTION

Figure 1:
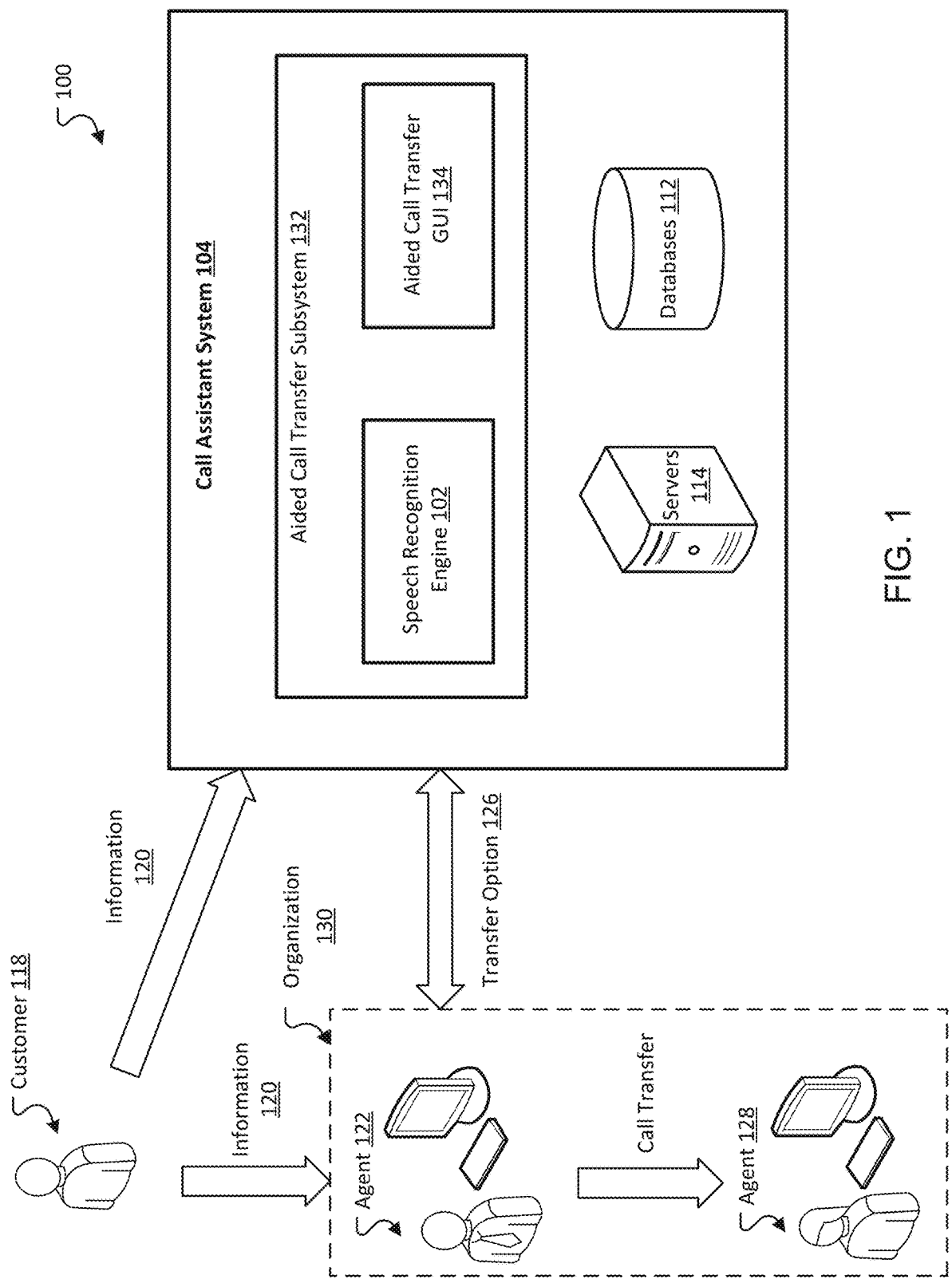
FIG. 1 illustrates an example of an environment for automatically determining a transfer option for transferring a call.

Call centers are widely deployed by companies, government agencies, and other organizations to handle incoming telephone calls from customers or users who want to ask questions and/or to request assistance. To handle such inquiries and requests, call centers are staffed with technical support personnel, customer service personnel, or sales support personnel (hereinafter collectively referred to as agents). Depending on the nature of an inquiry or a request for assistance, an agent may handle the inquiry or request by himself, or may forward the inquiry or request to another agent by transferring the call. As an organization may have a large number of departments and units, each with its own specialty, determining where a call should be transferred can be a difficult and time-consuming task.

In particular, to determine where a customer call should be transferred, an agent of an organization may use a search tool to search for a proper unit at a proper department that can handle the call. Using conventional search tools are inefficient and tedious, as these tools often rely on the agent's experience and understanding of the business and the structure of the organization to provide necessary information. For example, in order to narrow down search results, the agent may need to enter several exact keywords and/or to select multiple values from a series of drop-down lists. If the organization has a large, complex structure with many different departments and units, each with its own specialty, the agent may not know keywords that lead to a correct unit at a correct department, or the agent may not know which values should be selected from the drop-down lists. Navigating these conventional search tools is challenging, not only for new agents and third-party agents, but also for experienced agents. These agents may not fully understand which units handle which issues outside of their own unit. For example, a bank representative at a financial institution may not know that a new insurance claim can be routed to one of six different types of claims agents at the financial institution. In addition, during the time the agent spends searching for the correct department, the agent may not be paying attention to what the customer is saying and may misunderstand the customer's question or request. Inaccurate searches and misunderstood customer requests may result in incorrect transfers to wrong departments/units. Further, searching using keywords and drop-down lists may take a long time, e.g., up to five minutes or more if the agent is unfamiliar with the area. The time-consuming and inefficient transfer process wastes customer time, causes lost calls and call hang-ups due to incorrect transfers, and reduces customer satisfaction.

This specification describes a system and method for automatically determining a transfer option for transferring a call. In particular, the system includes a speech recognition engine that can automatically listen to a verbal conversation between a first individual (e.g., a user or customer of an organization) and a second individual (e.g., an employee of the organization) during a call to capture information (e.g., keywords) from the verbal conversation. The system includes an aided call transfer subsystem that can automatically determine potential transfer options based on the information captured by the speech recognition engine and optionally, on other additional inputs. The second individual can be, for example, a human agent working at a call center of an organization to support users and/or customers of the organization. The call between the agent and the user/customer can include any types of communication sessions such as Voice over Internet Protocol (VoIP) sessions, video chat sessions via the Internet, LAN, WAN, or any other communication network, call sessions conducted via landline telephones or mobile devices, and so on. As the conversation continues, the aided call transfer subsystem can dynamically adjust confidence scores associated with the potential transfer options. The confidence score for each potential transfer option represents a likelihood that the potential transfer option is the correct transfer option. That is, the potential transfer option identifies a receiving unit that can help the customer solve the customer's problem and/or satisfy the customer's need. The aided call transfer subsystem can determine, among the potential transfer options, a final transfer option that has the highest likelihood of being the correct transfer option, among the potential transfer options. Therefore, the system described herein provides improvements over existing systems as it can efficiently determine an accurate transfer option (e.g., a specific unit/agent where the call should be transferred) based on the conversation in an automatic manner, without relying on the agent' experience and knowledge about the organization's structure and business as required by conventional call transfer systems (i.e., the described system does not require extensive manual selections from the agent as required by conventional systems). By utilizing speech recognition technology, the system can remove the guesswork out of the transfer process, which is especially important for new agents, third party agents, or even experienced agents that are transferring the call to areas of the organization that they are not familiar with, and to allow agents to focus more on understanding customers and their needs. Using the system, the agent can confidently and easily make a call transfer not just to the general area but to the specific agent who will be best equipped to finish taking care of the customer.

The system therefore provides significant benefits for the organization, including reduced time spent for agents, reduced customer waiting time, reduced number of incorrect call transfers. The system further improves customer satisfaction as customer inquiries and requests are quickly handled by agents with matching expertise. These benefits can lead to higher revenues, e.g., by eliminating revenue losses that come from lost calls or call hang-ups due to incorrect transfers and by maximizing conversion rates by ensuring that callers have better overall customer experiences.

FIG. 1 illustrates an example of an environment 100 for determining a transfer option for transferring a call. The environment includes a call assistant system 104. The call assistant system 104 includes a server system 114, databases 112, and an aided call transfer subsystem 132. The aided call transfer subsystem 132 includes a speech recognition engine 102 and an aided call transfer graphical user interface 134 that enables a user, e.g., an agent, to interact with the aided call transfer subsystem 132. The server system 114 may include one or more servers coupled to the Internet or other computer network. The databases 112 and the aided call transfer subsystem 132 may reside at the server system 114. The server system 114 may be located at an organization or be distributed across the Internet or other computer network. The databases 112 stores data/information about customers or users of the organization, and products or services that have been obtained by the customers or users. For example, the organization can be a financial institution that offers multiple products and/or services such as banking services (e.g., checking/saving accounts, credit cards, auto loans, and mortgage loans), insurance products (e.g., car insurance, home insurance, and life insurance products), and/or investment services. The databases 112 can store, for each customer, customer information and detailed information about each of the products and/or services (e.g., contract terms, transaction history, recent activities, and payments) associated with the customer. The databases 112 may also store historical data/information about communications between customers and the financial institution, for example, inquiry emails from the customers and responses by the financial institution to the customers. The databases 112 may store recorded calls between customers and agents of the financial institution and/or a written summary of the content of the calls.

As shown in FIG. 1, in this example, a customer 118 calls an organization 130 to request assistance and/or to ask questions regarding a product or service that the customer 118 wants to obtain from the organization 130. The customer 118 may call a customer service number that directs the call to a call center of the organization 130. An agent 122 at the call center answers the call. The customer 118 provides the agent 122 with information 120 that includes a description of the customer's situation and questions/request that the customer 118 has. For example, the organization 130 may be a financial institution that offers various banking, investment and insurance products and services. In this example, the customer 118 makes a call because he has newly married and would like to open a joint account with his wife (e.g., a checking account or a saving account). During the conversation with the customer 118, the agent 122 can use the aided call transfer subsystem 132 to quickly determine an appropriate department/unit that can provide the customer 118 with the assistance and/or answer questions of the customer 118.

Figure 2A:
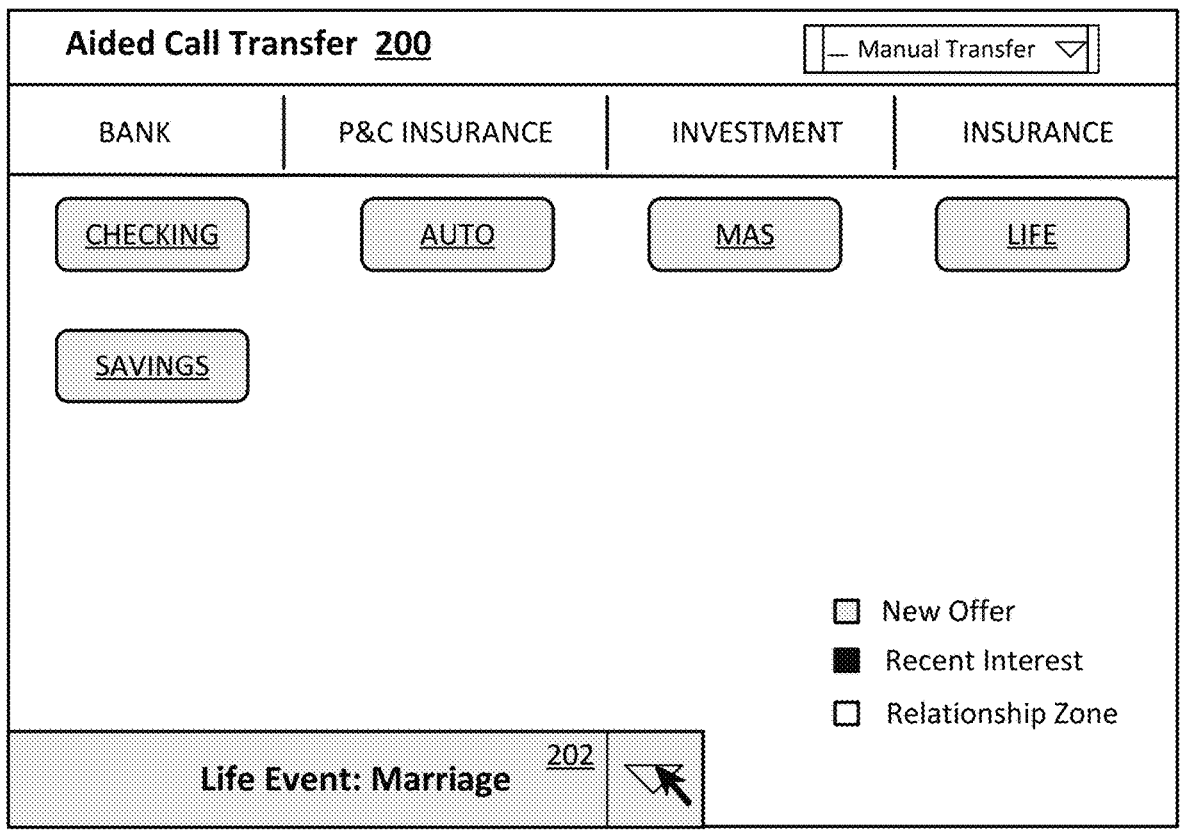

The subsystem 132 includes an aided call transfer GUI 134 that facilitates interactions with the agent 122 during the transfer process. The subsystem 132 can provide suggestions for transfer to the agent 122 through the GUI 134. Once a transfer option 126 is determined by the subsystem 132, the agent 122 can interact with the GUI 134 to quickly initiate the transfer (e.g., the agent 122 may only need two clicks to transfer the customer 118 to the correct department/unit). Example displays of the GUI 134 for the agent 122 to transfer a customer are illustrated in FIGS. 2A-2C. The agent 122 can use a computing device such as a desktop, a laptop, a mobile device, a tablet, or any other computing device to load the aided call transfer GUI 134 on the agent 122's computing device, for example, as a web application or a mobile application.

To automatically determine the transfer option 126 that matches the customer 118's situation and needs, the aided call transfer subsystem 132 includes the speech recognition engine 102 that is configured to listen to the conversation that the agent 122 is having with the customer 118 to extract information 120. The information 120 may include keywords and phrases that describe the customer 118's situation and intent/needs. As an example, when the customer 118 says "I've just got married," the speech recognition engine 102 captures the words "just got married" and the subsystem 132 identifies that the customer has a life event of getting married. In another example, another customer may call and say "I've just had a baby," the speech recognition engine 102 captures the words "had a baby," and the subsystem 132 identifies that the customer has a life event of having a baby.

The aided call transfer subsystem 132 can make suggestions as to where the customer 118 might be transferred as the conversation between the customer 118 and the agent 122 is happening. For example, in some implementations, once the subsystem 132 identifies that the customer 118 has a life event, the subsystem 132 can suggest potential transfer options, each corresponding to a service that the customer 118 may be interested in. For instance, the subsystem 132 can populate on the aided call transfer GUI 134 transfer options such as "life insurance," "saving account," "checking account," "auto insurance." In some implementation, the subsystem 132 may assign each of the potential transfer options a confidence score that represents a likelihood that the potential transfer option is the correct transfer option. As the speech recognition engine 102 continues listening to the conversation and learning more about the customer 118's intent/needs, the subsystem 132 can adjust the confidence scores of the potential transfer options.

For example, when the conversation goes, the speech recognition engine 102 is hearing more needs to open a bank account (for instance, the engine 102 recognizes that the "bank account" keyword is repeated several times during the conversation). In this case, the subsystem 132 can adjust the confidence scores associated with the potential transfer options, (for example, by increasing the confidence scores associated with the "saving account" and "checking account" transfer options), and lowering the confidence scores associated with the remaining transfer options if their topics cannot co-exist as part of the user's same intent. In some cases, if other pairs of topics might be able to co-exist, for example, if one topic is a sub-topic of another (e.g., "account" and "account balance"), the subsystem 132 can raise the confidence scores of transfer options associated with co-existing topics at the same time.

As another example, the subsystem 132 can take into consideration the surrounding context of the call to help gauge the caller's intent/propensity to need a call transfer. For example, if a caller says, "I'd like to bring my business over to your company," in which case the subsystem 132 can determine that a business insurance policy may initially seem to be an appropriate choice, and can assign a corresponding initial confidence score to an option to transfer the call to the business insurance policy unit. However, as the subsystem 132 hears more of the conversation (e.g. direct deposit, bill pay, etc.), the subsystem 132 can determine that the business in question is primarily banking needs. The subsystem 132 can then suggest other potential transfer options related to banking needs and assign, to each of these potential transfer options, a corresponding confidence score that will be adjusted in real-time based on the ongoing conversation.

The subsystem 132 can continue adjusting the confidence scores on-the-fly as the conversation continues. For example, adjusting of the confidence scores can be based on frequency and/or a number of times that a particular word or phrase (e.g., "checking account") is uttered during the call. The more frequently a particular word or phrase is uttered, the higher score the transfer option associated with that word or phrase has. The subsystem 132 can determine, as the final transfer option, the potential transfer option that has the highest confidence score among the potential transfer options.

In the example of FIG. 2, at the end of the conversation, the speech recognition engine 102 is hearing from the customer that he wants to open a joint checking account with his wife. In response, the subsystem 132 can automatically increase the confidence score associated with the "checking account" and lower the confidence scores associated with other transfer options. The subsystem 132 can finally determine the "checking account" transfer option as the final transfer option (i.e., the transfer option 126 on FIG. 1) because it has the highest confidence score among the potential transfer options and therefore best matches the customer 118's intent/needs. Based on the determined transfer option 126, the subsystem 132 can determine that the call should be transfer to an appropriate transfer unit (e.g., New Member Solutions unit) that can assist the customer 118 to open the joint checking account. In some implementations, if the confidence score associated with a potential transfer option is below a predetermined threshold confidence level (e.g., 30%, 40%, 50% or 60%), the subsystem 132 can decide not to share a suggestion of that potential transfer option to the agent 122. For example, if a caller initiates a conversation by saying "I'd like to open an account with you all," the subsystem 132 can determine that the caller's statement could mean about (i) any products that the organization provides, or (ii) no product at all yet (e.g., because the caller could just need help with web site support in starting a new online account). In this case, the subsystem 132 may assign to an "account" transfer option a low initial confidence score (e.g., 3%) that is well below a predetermined threshold confidence level (e.g., 30%). In this case, the subsystem 132 can decide not to share a suggestion of the account transfer option to the agent 122 yet, but waiting until the confidence score improves or other transfer options with better confidence scores are determined.

In some implementations, the subsystem 132 can apply color-coding when populating suggestions on the GUI 134. For example, the subsystem 132 can assign the potential transfer options light colors such as light grey. Once the subsystem 132 determines a transfer option that best matches the customer 118's intent/needs, the subsystem 132 can change the color of the determined transfer option to a deeper color. For instance, in the above example, the system 132 may change the "checking" option to dark grey, green, or red.

In some implementations, the aided call transfer subsystem 132 can suggest transfer options based on multiple inputs. The inputs include information 120 captured by the speech recognition engine 102 and related to customer 118's situation and intent/needs (e.g. the customer 118 mentions during the conversation that he wants to open a checking account). The inputs may further include information from the customer 118's profile stored at the databases 112 (e.g. if the customer 118 has a checking account and wants to open a second one, the subsystem 132 can automatically suggest the agent 122 to transfer the customer 118 to an account servicing unit rather than a bank acquisitions unit). Optionally, the inputs may include other additional inputs, e.g., the customer 118 has previously indicated interest on an auto insurance sales lead, and thus the subsystem 132 can suggest the customer to speak with an auto insurance unit if interested.

In some implementations, the aided call transfer subsystem 132 can map a customer to a particular agent based on matching attributes. For example, the subsystem 132 can identify that a customer, who is calling to request assistance, is a single mom who previously worked in military and has children. The subsystem 132 can identify that the customer having "single mom" and "military" attributes. The aided call transfer subsystem 132 can identify a particular agent who has similar life experience (e.g., an agent who possesses "military" and "single mom" attributes) and map the customer to identified agent. After identifying the transfer option 126 that matches the customer 118's situation and needs (or after identifying a particular agent having attributes that match the customer's attribute), the aided call transfer subsystem 132 may allow the agent 122 to select the identified transfer option 126 through the GUI 134. Once the agent 122 makes a selection, the subsystem 132 can display on the GUI 134 a transfer box. The transfer box identifies a unit where the customer 118 will be transferred and a transfer button.

In some implementations, the transfer box may include a checkbox for the agent 122 to select whether the agent 122 wants to conduct a warm transfer. That means after the agent 122 initiates a call transfer (e.g., the agent 122 clicks on the transfer button and the subsystem 132 automatically transfers the call to the identified unit/agent), the agent 122 will wait until a receiving agent answers the call, and the agent 122 will make an introduction between the customer 118 and the receiving agent before leaving the conversation.

In some implementations, the transfer box may include space for the agent 122 to fill out notes to the receiving agent. The notes may include a brief description of the customer 118's situation and needs. In some implementations, the aided call transfer subsystem 132 can automatically prefill the notes to the receiving agent.

In some implementations, the subsystem 132 can automatically determine when the next agent is available to take the transfer. The subsystem 132 may display in the transfer box the name of the agent who is going to receive the transfer. The subsystem 132 may also display in the transfer box approximate waiting time for the next agent. By providing the agent 122 with the name of the receiving agent, the subsystem 132 gives the agent 122 the ability to do a warm transfer without waiting until the receiving agent picks up the call. For example, the agent 122 can tell the customer 118 "I will transfer your call to John Smith at New Member Solutions division. He will help you open a joint checking account today," then transfer the call to John Smith, and exit the conversation without waiting on the line for John to answer.

In some implementations, the subsystem 132 can automatically update customer information (e.g., automatically prefilling life events) across different channels based on the conversation. For example, the customer 118 may have multiple accounts, each with a separate business unit within the financial institution. The subsystem 132 can automatically update the customer 118's profile with the new life event. The update can be automatically replicated in all accounts that the customer 118 has with the financial institution. Thus, the financial institution does not need to rely on agents for updating/prefilling life events.

Another example of how the aided call transfer subsystem 132 dynamically helps an human agent to determine where an ongoing call should be transferred is described as follows. While speaking to a deposit agent, a customer member had mentioned the word "insurance" several times and that he had recently married. The subsystem 132 determines that the customer may have potential interest in insurance. Given the life event, the subsystem 132 determines potential relevance for the need for a life insurance quote. However, the customer has also briefly complained about an increase to his auto insurance premium. The subsystem 132 hears the complaint and also detects that there was a recent change of the customer's address, causing a 15% increase to his insurance premium. In response, the subsystem 132 can suggest to the deposit agent that the customer might be better served at the moment by speaking to an auto insurance specialist. The deposit agent may inform the customer of the option to speak with an auto insurance specialist, and if the customer decides to take the option, in as little as two clicks of a mouse button, the deposit agent can transfer the customer to an auto agent who is equipped to handle threats to cancel (e.g., an auto agent at the Member Solutions Specialist level). However, the customer responds that he was expecting rates to be higher as he moved back into the city, and he had no need to discuss auto insurance. As such, the agent spends the same two mouse button clicks to transfer the customer to the life insurance specialist for a quote for his family. The subsystem 132 can dynamically route the customer to an acquisition specialist since the customer has not had any life insurance policy to begin with.

FIGS. 2A-2C illustrate simplified example graphical user interface (GUI) 200 of an aided call transfer system for an agent to transfer a call.

For illustration purposes, FIGS. 2A-2G illustrates different views of the GUI 200 as a result of interactions between an agent (e.g., the agent 122 of FIG. 1) and the aided call transfer system (e.g., the subsystem 132 of FIG. 1). As described in the description associated with FIG. 1, the agent 122 is having a conversation which customer 118, who has newly married and wants to open a joint checking account with his wife. The agent 122 is looking to transfer the call from customer 118 to an appropriate unit/agent who can best assist customer 118.

FIG. 2A illustrates potential transfer options that the aided call transfer system may initially suggest to the agent after hearing that the customer just had a life event of getting married. The potential transfer options may be options that customers having similar life event should consider or often consider. In particular, the system can populate on the GUI 200 the words "Checking" and "Savings" under the "Bank" field, which represent options to speak with checking account service and savings account service at a bank; "Auto" under "P&C Insurance" field, which represents an option to speak with auto insurance service at Property and Casualty Insurance group; "MAS" under "Investment" field, which represents an option to speak with member acquisition service at Investment department in order to create a new investment account; and "Life" under "Insurance" field, which represents life insurance service at Insurance department. The system can apply color-coding on these transfer options. For example, the "checking," "saving," "auto," "MAS," and "life" options can be associated with a light color, e.g., light grey.

In some implementations, the system can automatically display on the GUI 200 a life event of the customer after the system hears that the customer has newly married. For example, as shown in FIG. 2B, the system displays "Life Event: Marriage" 202 on the GUI 200. The system may provide the agent an option to add a life event to the customer's profile or record, e.g., by selecting the "Life Event: Marriage" 202. Upon the agent's selection, the system may display an "Add a Life Event" box 204 that allows the agent to modify the life event, to specify the estimated date of the event, how the event affects the customer (e.g., does the event only affect the customer, the customer's spouse, or both?), and to add notes related to event. The agent may click "OK" button to add the life event to the customer's profile or record, or click "Cancel" button to cancel the addition of the life event. In some implementations, the system can automatically pre-fill the required information in the "Add a Life Event" box 204 based on what the system hears from the conversation without requiring the agent to manually enter the required information. The system may allow the agent to confirm or modify the pre-filled information before adding the life event to the customer's profile or record.

Once the system continues listening to the conversation and learning more about the customer's intent/needs, the system can prioritize the potential transfer options and can dynamically determine one or more transfer options among the potential transfer options that best match the customer's intent/needs based on the ongoing conversation. For example, as the conversation goes, the system is hearing more needs to open a joint checking account. The system can then determine that the call should be transfer to "checking" account service that can assist the customer to open the joint checking account. As shown in FIG. 2B, the system can dynamically change the color of the "checking," for example, to dark grey, to let the agent know that the "checking" option best matches the customer's needs at the moment.

As shown in FIG. 2C, the agent can select the "checking" transfer option to transfer the call. Upon the agent's selection, the system can display a transfer box 206. The transfer box identifies the name of the unit or agent where the call will be transferred (e.g., "New Member Solutions" unit that can help the customer to open the checking account). The transfer box 206 may include a checkbox 208 for the agent to select whether the agent wants to conduct a warm transfer. That means after the agent initiates a call transfer (e.g., the agent clicks on the transfer button and the system automatically transfers the call to the identified unit/agent), the agent will wait until a receiving agent answers the call, and the agent will make an introduction between the customer and the receiving agent before leaving the conversation.

In some implementations, the transfer box may include space 210 for the agent to fill out notes to the receiving agent. The notes may include a brief description of the customer's situation and needs. For example, the agent may include a note saying "Customer just got married and is looking to open up a joint checking account with his wife." In some implementations, the system can automatically prefill the notes to the receiving agent.

In some implementations, the transfer box may include information about hours of operation 212 of the unit/agent where the call should be transferred. This information allows the agent to make sure that the receiving unit/agent is available before initiating the transfer. The agent can initiate the call by selecting the "Transfer" button 214, and the system will automatically route the call to the identified unit/agent.

Figure 3:
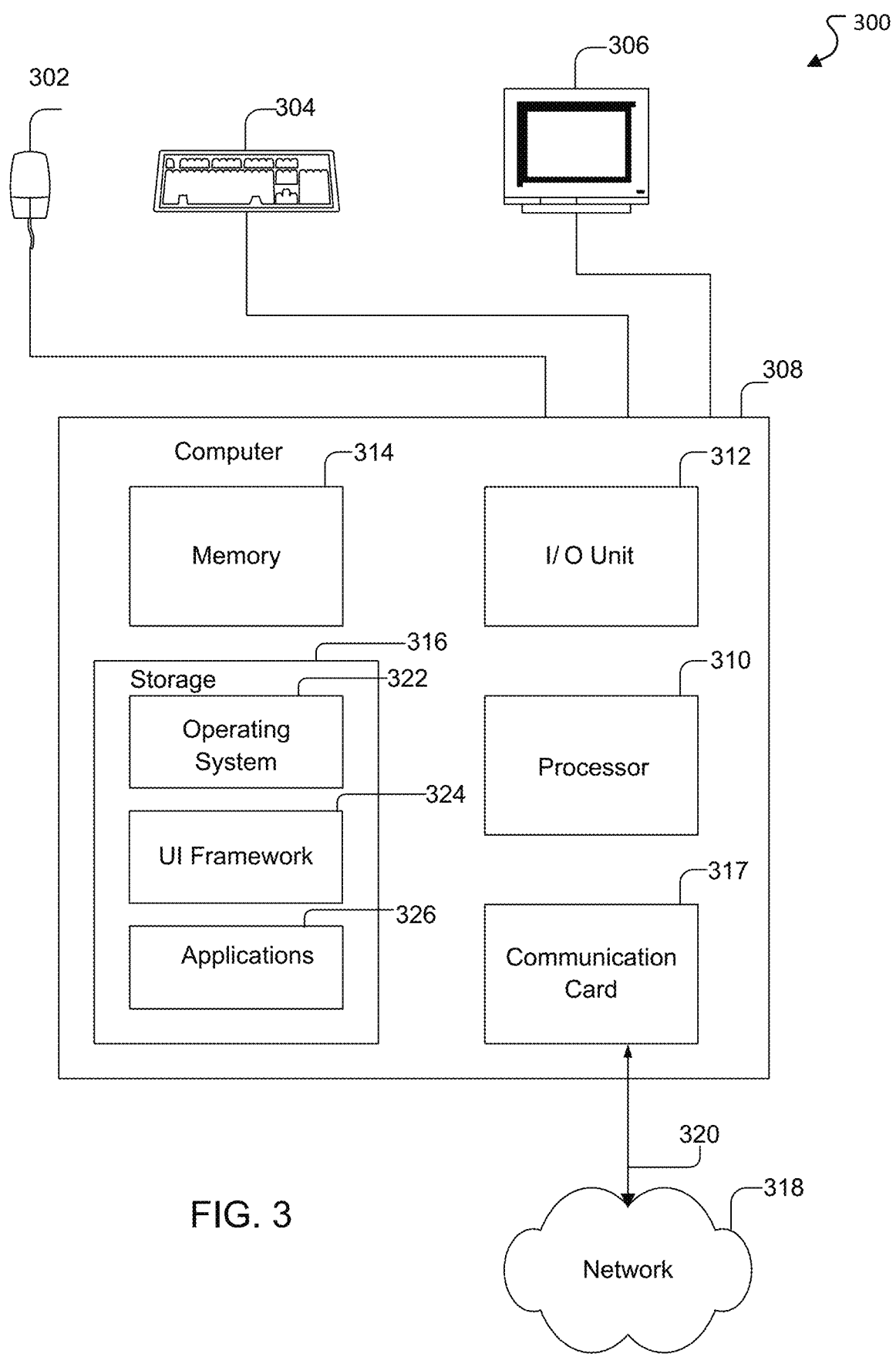
FIG. 3 illustrates an example architecture of a computing system suitable for implementing a call assistant system.

FIG. 3 illustrates an example of an architecture of a computing system 300 suitable for implementing the call assistant system 104 of FIG. 1. The computing system 300 includes input/output (I/O) devices, such as mouse 302, keyboard 304, and display 306, and a central processing unit (CPU) 308. CPU 308 includes a processor 310, an I/O unit 312, memory 314, storage 316, and communications card 317 (e.g., a modem or a network adapter) for exchanging data with a network 318 via a communications link 320 (e.g., a telephone line, a wireless network link, or a cable network). The network 318 can be provided by an internal network service available within an organization. Alternatively, or additionally, the network 318 can include an external network(s) that is available via the Internet or other networked services (e.g., a cloud computing service, a data center, or other remotely accessible medium outside of an organization's internal network). System 300 may be implemented as, for example, a personal computer, a workstation, a server, a cellular telephone, or a personal digital assistant.

Storage 316 stores data and various programs such as an operating system (OS) 322. The OS 322 is a program that controls the functionality and interaction of the hardware components of the computing system 300 and that facilitates the operation of other programs executing on the CPU 208. Windows Me, Windows XP, Linux, and MacOS are examples of common operating systems for personal computers. Windows CE or Windows Embedded are examples of common embedded operating systems used in cellular telephones or personal digital assistants. Examples of programs include the speech recognition engine 102, the aided call transfer GUI 134, and the aided call transfer subsystem 132 of FIG. 1.

Storage 316 also stores a UI framework 324 and applications 326. The UI framework 324 is a collection of code that implements user interfaces and associated logic for applications 326 running on the CPU 308. For example, the UI framework can be used to implement the aided call transfer GUI 134 through which the agent 122 interacts with the aided call transfer subsystem 132 (e.g., the agent 122 may receive suggestions for transfer options and initiate a transfer through the GUI 134). An example of the user interface is illustrated in FIGS. 2A-2C.

In general, the UI framework 324 resides between the applications 326 and the OS 322. In other words, applications 326 interact with the UI framework 324 to initiate UI functions, and then the UI framework 324 calls routines of the OS 322 to implement the initiated UI functions. A user of the computing system 300 may interact with applications 326 running on the CPU 308 through UIs by using I/O devices such as, for example, mouse 302, keyboard 304, and display 306.

The computing system 300 of FIG. 3 is merely one example of a computing system for implementing the systems, methods, and techniques described herein. Other computing systems may be used to implement these systems, methods, and techniques.

Figure 4:
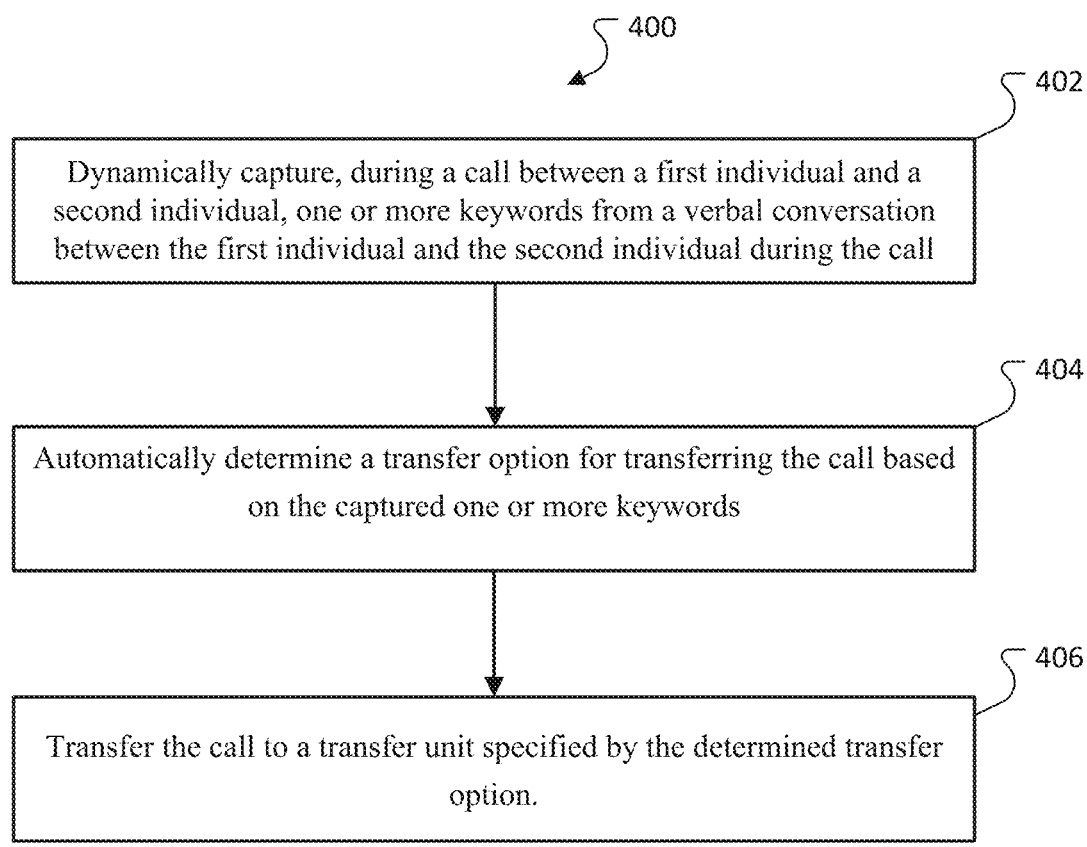
FIG. 4 illustrates a flowchart of an exemplary process for automatically determining a transfer option for transferring a call.

FIG. 4 illustrates a flowchart of an exemplary process 400 for providing a transfer option for transferring a call. For convenience, the process 400 will be described as being performed by a system of one or more computers located in one or more locations. For example, a call assistant system (e.g., the call assistant system 104 or the aided call transfer subsystem 132 of FIG. 1), appropriately programmed, can perform the process.

The system dynamically captures one or more keywords from a verbal conversation between a first individual and a second individual during a call (step 402). That means, the system extracts one or more keywords from the verbal conversation in real-time or near real-time relative to the time when the one or more keywords are uttered by the first individual or second individuals or both. The system may dynamically capture the one or more keywords using a speech recognition engine. In particular, the speech recognition engine can transcribe the ongoing verbal conversation to speech transcripts, and process the speech transcripts to extract meaningful keywords (e.g., by filtering out informal words, filler words, repetitive words, or pronouns, etc. that do not contain information) in real-time or near real-time relative to the time when these meaningful keywords are uttered.

The second individual may be an employee of an organization (e.g., an agent who supports users or customers) and the first individual may be a user or a customer who uses a product or service provided by the organization.

The system automatically determines a transfer option for transferring the call based on the captured one or more keywords (step 404). In particular, the system may automatically determine, based on a first set of keywords, multiple potential transfer options for transferring the call. The first set of keywords is determined, by the speech recognition engine, from a first part of the conversation between the user and the second individual. Subsequently, the system may automatically determine, among the potential transfer options, the transfer option based on a second set of keywords. The second set of keywords is determined, by the speech recognition engine, from a second part of the conversation between the first individual and the second individual.

In some cases, the first set of keywords includes a keyword that indicates a life event of the user. In these cases, the system can automatically update a user profile of the first individual with the life event.

After determining the transfer option, the system transfers the call to a second agent working at a transfer unit specified by the determined transfer option. (step 406).

In some cases, the system may display, on the user device, an option for transferring the call to the transfer unit using warm transfer and another option for transferring the call to the transfer unit using cold transfer. The system can receive, from the user device, a selection of one of the warm transfer option or the cold transfer option. The system can automatically transfer the call to the transfer unit using the selected warm transfer option or cold transfer option.

In some cases, the system can automatically pre-fill a note and send the pre-filled note to a second agent at the transfer unit based on the conversation between the first individual and the second individual during the call. The pre-filled note allows the second agent to quickly understand the context of the call transferred to him without needing the first individual to explain the first individual's needs, intent, and/or concerns again, thereby saving time for both of the first individual and the second agent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method performed by at least one processor, the method comprising:
   dynamically capturing, by the at least one processor, during a call between a first individual and a second individual, one or more keywords from a verbal conversation between the first individual and the second individual during the call;
   automatically determining, by the at least one processor, a transfer option from among a plurality of candidate transfer options for transferring the call based on the captured one or more keywords, wherein each of the candidate transfer options specifies a different respective transfer unit for receiving the call;
   providing a display of the determined transfer option on a graphical user interface rendered using a user device of the second individual, wherein providing the display of the determined transaction option comprises:
      presenting the graphical user interface using the user device of the second individual, the graphical user interface comprising a graphical representation of each of the plurality of candidate transfer options, and
      visually emphasizing the determined transfer option on the graphical user interface relative to the other candidate transfer options, concurrently with presenting the graphical representation of each of the plurality of candidate transfer options on the graphical user interface;
   receiving, from the user device, a selection of the determined transfer option using the graphical user interface; and
   automatically transferring, by the at least one processor, the call to the transfer unit specified by the determined transfer option.

2. The method of claim 1, wherein automatically determining the transfer option comprises:
   automatically determining, based on a first set of keywords, the plurality of candidate transfer options for transferring the call, wherein the first set of keywords is extracted, by the at least one processor, from a first part of the verbal conversation between the first individual and the second individual; and automatically determining, among the plurality of candidate transfer options, the transfer option based on a second set of keywords, wherein the second set of keywords is extracted, by the at least one processor, from a second part of the verbal conversation between the first individual and the second individual.

3. The method of claim 2, wherein the first set of keywords includes a keyword that indicates a life event of the first individual.

4. The method of claim 3, further comprising:
automatically updating a user profile of the first individual with the life event.

5. The method of claim 1, wherein the second individual is employed by an organization and the transfer option specifies the transfer unit at the organization for receiving the call.

6. The method of claim 1, wherein:
providing the display of the determined transfer option on the graphical user interface rendered using the user device of the second individual comprises: providing a display of (i) a warm transfer option for transferring the call to the identified unit using warm transfer, and (ii) a cold transfer option for transferring the call to the identified unit using cold transfer;
receiving, from the user device, the selection of the determined transfer option comprises: receiving a selection of one of the warm transfer option or the cold transfer option; and
automatically transferring the call to the transfer unit specified by the transfer option comprises: automatically transferring the call to the transfer unit specified by the transfer option using the selected warm transfer option or cold transfer option.

7. The method of claim 1, further comprising:
automatically pre-filling a note including a context of the verbal conversation between the first individual and the second individual, and
automatically sending the pre-filled note to the transfer unit specified by the transfer option before transferring the call to the transfer unit specified by the transfer option.

8. A system comprising:
at least one computer; and
a computer-readable medium coupled to the at least one computer having instructions stored thereon which, when executed by the at least one computer, cause the at least one computer to perform operations comprising:
dynamically capturing during a call between a first individual and a second individual, one or more keywords from a verbal conversation between the first individual and the second individual during the call;
automatically determining a transfer option from among a plurality of candidate transfer options for transferring the call based on the captured one or more keywords, wherein each of the candidate transfer options specifies a different respective transfer unit for receiving the call;
providing a display of the determined transfer option on a graphical user interface rendered using a user device of the second individual, wherein providing the display of the determined transaction option comprises:
presenting the graphical user interface using the user device of the second individual, the graphical user interface comprising a graphical representation of each of the plurality of candidate transfer options, and
visually emphasizing the determined transfer option on the graphical user interface relative to the other candidate transfer options, concurrently with presenting the graphical representation of each of the plurality of candidate transfer options on the graphical user interface;
receiving, from the user device, a selection of the determined transfer option using the graphical user interface; and
automatically transferring the call to the transfer unit specified by the determined transfer option.

9. The system of claim 8, wherein automatically determining the transfer option comprises:
automatically determining, based on a first set of keywords, the plurality of candidate transfer options for transferring the call, wherein the first set of keywords is extracted, by the speech recognition engine, from a first part of the conversation between the first individual and the second individual; and
automatically determining, among the plurality of candidate transfer options, the transfer option based on a second set of keywords, wherein the second set of keywords is extracted, by the speech recognition engine, from a second part of the conversation between the first individual and the second individual.

10. The system of claim 9, wherein the first set of keywords includes a keyword that indicates a life event of the first individual.

11. The system of claim 8, wherein the second individual is employed by an organization and the transfer option specifies the transfer unit at the organization for receiving the call.

12. The system of claim 8, wherein:
providing the display of the determined transfer option on the graphical user interface rendered using the user device of the second individual comprises: providing a display of (i) a warm transfer option for transferring the call to the identified unit using warm transfer, and (ii) a cold transfer option for transferring the call to the identified unit using cold transfer;
receiving, from the user device, the selection of the determined transfer option comprises: receiving a selection of one of the warm transfer option or the cold transfer option; and
automatically transferring the call to the transfer unit specified by the transfer option comprises: automatically transferring the call to the specified by the transfer option using the selected warm transfer option or cold transfer option.

13. The system of claim 8, wherein the operations further comprise:
automatically pre-filling a note including a context of the verbal conversation between the first individual and the second individual, and
automatically sending the pre-filled note to the transfer unit specified by the transfer option before transferring the call to the transfer unit specified by the transfer option.

14. A non-transitory computer-readable medium coupled to at least one computer having instructions stored thereon which, when executed by the at least one computer, cause the at least one computer to perform operations comprising:
dynamically capturing during a call between a first individual and a second individual, one or more keywords from a verbal conversation between the first individual and the second individual during the call;

automatically determining a transfer option from among a plurality of candidate transfer options for transferring the call based on the captured one or more keywords, wherein each of the candidate transfer options specifies a different respective transfer unit for receiving the call;

providing a display of the determined transfer option on a graphical user interface rendered using a user device of the second individual, wherein providing the display of the determined transaction option comprises:

presenting the graphical user interface using the user device of the second individual, the graphical user interface comprising a graphical representation of each of the plurality of candidate transfer options, and visually emphasizing the determined transfer option on the graphical user interface relative to the other candidate transfer options, concurrently with presenting the graphical representation of each of the plurality of candidate transfer options on the graphical user interface;

receiving, from the user device, a selection of the determined transfer option using the graphical user interface; and automatically transferring the call to the transfer unit specified by the determined transfer option.

15. The non-transitory computer-readable medium of claim 14, wherein automatically determining the transfer option comprises:

automatically determining, based on a first set of keywords, the plurality of candidate transfer options for transferring the call, wherein the first set of keywords is extracted, by a speech recognition engine, from a first part of the conversation between the first individual and the second individual; and automatically determining, among the plurality of candidate transfer options, the transfer option based on a second set of keywords, wherein the second set of keywords is extracted, by the speech recognition engine, from a second part of the conversation between the first individual and the second individual.

16. The non-transitory computer-readable medium of claim 14, wherein:

providing the display of the determined transfer option on the graphical user interface rendered using the user device of the second individual comprises: providing a display of (i) a warm transfer option for transferring the call to the identified unit using warm transfer, and (ii) a cold transfer option for transferring the call to the identified unit using cold transfer;

receiving, from the user device, the selection of the determined transfer option comprises: receiving a selection of one of the warm transfer option or the cold transfer option; and automatically transferring the call to the transfer unit specified by the transfer option comprises: automatically transferring the call to the transfer unit specified by the transfer option using the selected warm transfer option or cold transfer option.

17. The non-transitory computer-readable medium of claim 14, wherein the operations further comprise:

automatically pre-filling a note to a second agent at the transfer unit specified by the transfer option based on the conversation between the first individual and the second individual, and automatically sending the pre-filled note to the second agent before transferring the call to the second agent.

18. The method of claim 5, wherein the organization is a financial institution.

* * * * *